United States Patent
Menadeva et al.

(10) Patent No.: US 10,254,845 B2
(45) Date of Patent: Apr. 9, 2019

(54) HAND GESTURE RECOGNITION FOR CURSOR CONTROL

(71) Applicant: Intel Corporation, Santa Clara, CA (US)

(72) Inventors: Ovadya Menadeva, Modiin (IL); Kfir Viente, Jerusalem (IL); Maoz Madmony, Beit Kama (IL); Maxim Schwartz, Mevaseret Tzion (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/197,288

(22) Filed: Jun. 29, 2016

(65) Prior Publication Data
US 2017/0192515 A1 Jul. 6, 2017

Related U.S. Application Data (60) Provisional application No. 62/275,057, filed on Jan. 5, 2016.

(51) Int. Cl.
| | |
|---|---|
| *G06F 3/01* | (2006.01) |
| *G06F 3/0481* | (2013.01) |
| *G06F 3/0488* | (2013.01) |
| *G06K 9/00* | (2006.01) |

(52) U.S. Cl.
CPC .......... *G06F 3/017* (2013.01); *G06F 3/04812* (2013.01); *G06F 3/04883* (2013.01); *G06K 9/00355* (2013.01); *G06T 2207/20072* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,850,252 B1 * | 2/2005 | Hoffberg | G06K 9/00369 348/E7.061 |
| 8,203,605 B1 | 6/2012 | Starner | |
| 2012/0027252 A1 | 2/2012 | Liu et al. | |
| 2012/0033132 A1 | 2/2012 | Chen et al. | |
| 2012/0086864 A1 | 4/2012 | Williams et al. | |
| 2012/0219213 A1 | 8/2012 | Wang et al. | |

(Continued)

OTHER PUBLICATIONS

PCT International Search Report, PCT Application No. PCT/US2016/059583, date of completion Dec. 16, 2016, 3 pages.

*Primary Examiner* — Gustavo D Polo
(74) *Attorney, Agent, or Firm* — International IP Law Group, P.L.L.C.

(57) ABSTRACT

A system for hand gesture recognition is described herein. The system includes a display, camera, memory, and processor. The memory that is to store instructions and is communicatively coupled to the camera and the display. The processor is communicatively coupled to the camera, the display, and the memory. When the processor is to execute the instructions, the processor is to estimate one or more motion vectors of an object using a pair of consecutive frames and estimate an average motion vector of the object. The processor is also to obtain a descriptor based on histogram values from a histogram of optical flow (HOOF) of the one or more motion vectors and the average motion vector and classify the descriptor as a gesture.

25 Claims, 8 Drawing Sheets

(56) References Cited

U.S. PATENT DOCUMENTS

| | | |
|---|---|---|
| 2012/0314772 A1 | 12/2012 | Chen |
| 2013/0156348 A1 | 6/2013 | Irani et al. |
| 2013/0271397 A1 | 10/2013 | MacDougall |
| 2015/0116597 A1 | 4/2015 | Chandraker et al. |
| 2015/0243038 A1 | 8/2015 | Zhao |
| 2016/0148391 A1 | 5/2016 | Chua et al. |
| 2017/0182406 A1 | 6/2017 | Castiglia et al. |
| 2017/0185166 A1* | 6/2017 | Madmony ............. G06F 3/0304 |
| 2017/0192515 A1 | 7/2017 | Menadeva et al. |

* cited by examiner

HAND GESTURE RECOGNITION FOR CURSOR CONTROL

CROSS-REFERENCE TO RELATED APPLICATION

The present application claims the benefit of U.S. Provisional Patent Application Ser. No. 62/275,057 by Menadeva, et al., which is titled "Hand Gesture Recognition for Cursor Control" and was filed Jan. 5, 2016, the disclosure of which is incorporated herein by this reference as though fully set forth herein.

BACKGROUND ART

Electronic devices can enable computer vision by duplicating the abilities of human vision by electronically perceiving and understanding an image. In some cases, the electronic device will follow or track the movements of a set of interest points or objects in an image sequence. In particular, the electronic device can track the movements of a human hand to implement a user-interface with the electronic device. The ability to provide a hand-tracking mechanism is fundamental in implementing a natural user interface based on hand gestures.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, a hand-tracking mechanism is used to implement a natural user interface with an electronic device based on hand gestures. Hand gestures can be determined via a variety of algorithms. For example, in some cases, a three dimensional (3D) model algorithm, skeletal model algorithm, or an appearance based algorithm is used to recognize hand gestures. The 3D model and the skeleton based algorithms demand accurate and robust tracking of the hand. Implementing a 3D model is a complex task and often the output from such algorithm is very noisy and inaccurate in non-deterministic way. The appearance based algorithm derives information directly from the image and the uses spatial features such as gradients, template matching, and the like. Appearance based algorithms are mainly used for posture recognition and depend on an invariant characteristic, such as rotation, scale, and the like, of the features.

Embodiments described herein enable hand gesture recognition. In embodiments, a main motion vector of a hand is analyzed. In order to evaluate the main movement of the object, an optical flow algorithm is used to track pixels on a hand mask. A specific point is not tracked, rather a main motion vector of the hand is calculated and used to apply movement to a rendered cursor. A histogram of optical flow is calculated. A descriptor may be generated based on the motion vector and the histogram of optical flow. The descriptor may then be classified as a gesture. While the present techniques refer to hand gestures, gestures with an object may also be used.

Figure 1:
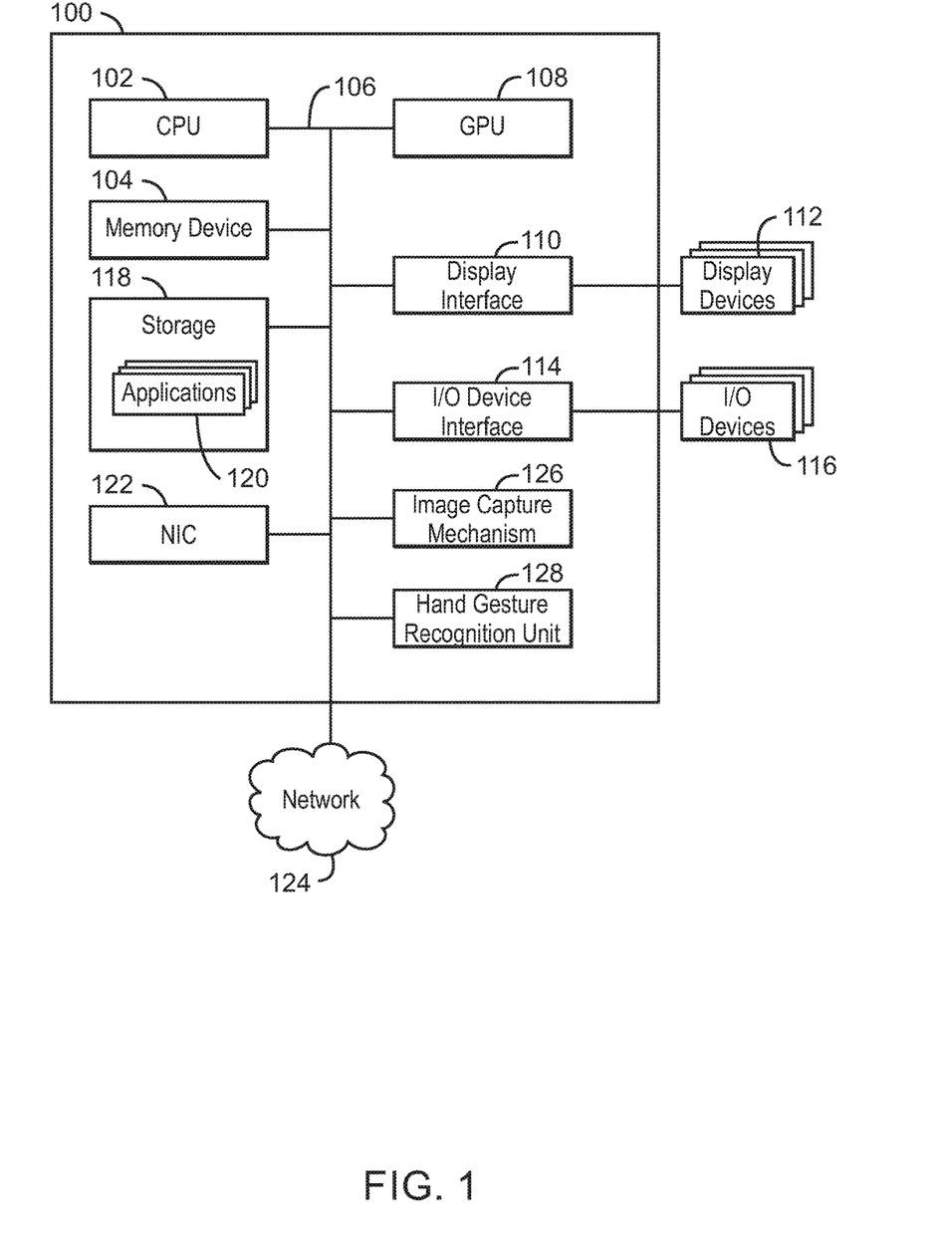
FIG. 1 is a block diagram of an electronic device that can be used to enable hand gesture recognition.

FIG. 1 is a block diagram of an electronic device 100 that can be used to enable hand gesture recognition. The electronic device 100 can be, for example, a laptop computer, desktop computer, tablet computer, mobile device, or server, among others. In particular, the electronic device 100 can be a mobile device such as a cellular phone, a smartphone, a personal digital assistant (PDA), phablet, or a tablet. Additionally, the electronic device 100 can be any device that is to track various hands, limbs, or objects, such as a gaming console or a component of a gaming console. The electronic device 100 can include a central processing unit (CPU) 102 that is configured to execute stored instructions, as well as a memory device 104 that stores instructions that are executable by the CPU 102. The CPU can be coupled to the memory device 104 by a bus 106. Additionally, the CPU 102 can be a single core processor, a multi-core processor, a computing cluster, or any number of other configurations. Furthermore, the electronic device 100 can include more than one CPU 102. The memory device 104 can include random access memory (RAM), read only memory (ROM), flash memory, or any other suitable memory systems. For example, the memory device 104 can include dynamic random access memory (DRAM).

The electronic device 100 can also include a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a storage device 118. The storage device 118 is a physical memory such as a hard drive, a solid state drive, an optical drive, a thumbdrive, an array of drives, or any combinations thereof. The storage device 118 can also include remote storage drives such as used for cloud computing applications. The storage device 118 includes any number of applications 120 that are configured to run on the electronic device 100. In embodiments, the applications may be a plurality of applications that enables video game play or gesture based interaction with an electronic device.

The electronic device 100 can also include a network interface controller (NIC) 122. The NIC 122 can be configured to connect the electronic device 100 through the bus 106 to a network 124. The network 124 can be a wide area network (WAN), local area network (LAN), or the Internet, among others. The electronic device 100 also includes an image capture mechanism 126. In some examples, the image capture mechanism 126 is a camera, stereoscopic camera, scanner, infrared camera/sensor, heat dissipation camera, radar, or the like. The image capture mechanism 126 may capture depth, infrared, or color images of a scene. Additionally, the image capture mechanism may be a three-dimensional camera.

The electronic device 100 also includes a hand gesture recognition unit 128. The hand gesture recognition unit 128 may obtain images from the image capture mechanism 126. The image capture mechanism may be used to capture a scene, where the scene includes a field of view of the camera or a portion of the field of view of the camera. The scene may be captured as a series of frames. The hand gesture recognition unit 128 applies a robust algorithm to a sequence of frames from the image capture mechanism 126 in a frame to frame manner, and uses hand tracking to obtain a mask of the tracked hand. A histogram of optical flow based descriptor is obtained, and the descriptor is normalized and used to output a gesture event. The descriptor obtained according to the present techniques is a descriptor that that combines depth, infrared, and/or RGB data. In embodiments, normalizing the descriptor includes converting descriptor values from pixels to meter units.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

In embodiments, the image capture mechanism is used to obtain depth information of a scene. The depth information enables an accurate mask of a hand in the scene to be obtained. Using the depth data in order to obtain a mask of the hand removes the noise typically caused by various backgrounds. As used herein, the mask or contour of the hand may be the portion of the hand that defines a silhouette of the hand. A histogram of optical flow (HOOF) based descriptor is built using an optical flow algorithm, such as the Lucas-Kanade optical flow algorithm. In embodiments, a Lucas-Kanade optical flow algorithm is used to find corresponding points on the current frame image and a next frame. The Lucas-Kanade algorithm assumes that the flow is essentially constant in a local neighborhood of the pixel under consideration, and solves a set of basic optical flow equations for all the pixels in that neighborhood using the least squares criterion. The descriptor values may be normalized to be in meter units. In embodiments, the descriptor values are converted from pixel to meter units. Additionally, in embodiments, the descriptor values can be flipped horizontally and vertically in a very intuitive and fast manner. Flipping the descriptor values may be used to simulate descriptor values for the opposite hand, thus making descriptor values the same for each hand, regardless of the type of hand.

Figure 2:
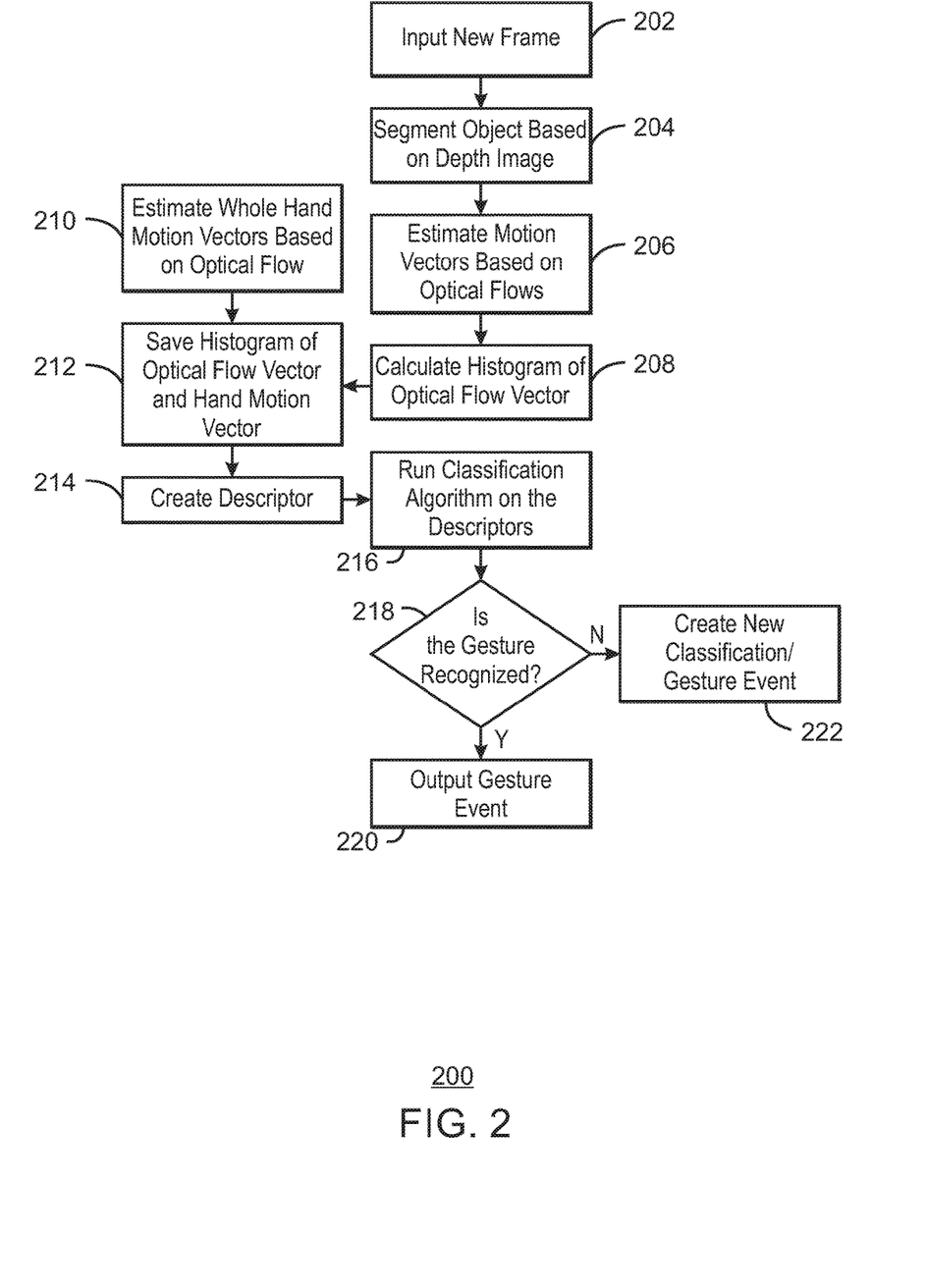
FIG. 2 is a process flow diagram of a method for gesture classification.

FIG. 2 is a process flow diagram of a method 200 for gesture classification. At block 202, a new frame is input to the system. The new frame may include depth data, infrared (IR) data, and/or RGB data. The depth data, infrared (IR) data, and RGB data may be referred to as a depth image, infrared (IR) image, and RGB image, respectively. At block 204, the hand is segmented using the depth image. In embodiments, the hand is segmented from the background such that an accurate mask of the hand aligns with the IR image or an RGB image. In embodiments, the depth image may be a depth map or any other image representation that provides depth information. In embodiments, any algorithm that extracts the object from the background can be used to segment or extract the object from an image.

At block 206, motion vectors are estimated based on the optical flow. In embodiments, the intersection of the feature points with the hand mask are tracked to estimate the motion vectors. To estimate motion vectors, the hand mask may be extracted using a background subtractor algorithm, an extractor algorithm, or the like. Good feature points are found on the extracted mask, and then the optical flow algorithm is to track these points. After running the optical flow, for each point found there is a motion vector that describes the movement of the hand. In embodiments, the optical flow is applied to an IR image, RGB image, grayscale image or any combination thereof for a pair of frames where the mask found using the depth image has been applied to the frames.

At block 208, a histogram of the optical flow vector is calculated. To construct the histogram, a range of possible values are placed into a bin. In other words, the entire range of values is divided into a series of intervals, the number of values that fall into each interval are counted. The bins are may be expressed as consecutive, non-overlapping intervals of a variable. In embodiments, a bounding box is applied to the hand mask, and then divided into a grid. In embodiments, the grid may be a 3×3 cell grid. For each cell in the grid, an 8-bin histogram of optical flow (HOOF) is calculated for all motion vectors. In embodiments, the 8-bin histogram is 8 bins of 45 degrees. The values of each histogram are divided by the number of motion vectors that were used to build the respective histogram to calculate an average value of each bin, for each cell of the grid. For example, an 8-bin histogram would have eight average values for each bin, for each cell in a nine cell grid, for a total of 72 values.

Accordingly, the nine HOOFs may be concatenated to one vector. In other words, the histogram values for each cell are linked into a single frame descriptor. For exemplary purposes, the grid is a 3×3 grid, with nine cells and nine HOOFs calculated. However, and number of cells can be used. Moreover, the bounding box can be divided in any fashion, and is not restricted to a grid like form. Combining the nine HOOFs into one vector results in a histogram based optical flow vector or a single frame feature vector.

In embodiments, the descriptor values may be calculated for each hand type by flipping descriptor values. Flipping descriptor values may be performed to simulate the left hand descriptor using the right hand data and vice versa. In embodiments, flipping the descriptor values is performed by swapping the right column with the left column in the 3×3 grid of cells. Also for each grid cell, the 8 bins in the cell also flipped. In particular, the 4 left side direction bins are swapped with the 4 right side direction bins. This results in a mirror of the descriptor along the vertical axis.

At block 210, whole hand motion vectors are estimated based on the optical flow. The whole hand motion vector may be obtained from any sort of frame to frame object tracking, such as a cursor tracker. The whole hand motion vectors can be estimated using as input the IR images or the RGB images. The optical flows at block 206 can be used to obtain the whole hand motion vectors. Specifically, good feature points of the object are found on the IR images or the RGB images. In embodiments, the good feature points may be obtained via corner detection. An optical flow algorithm may be ran on the good feature points. The motion vectors, determined by the optical flow, may be sorted by size.

A predefined threshold is applied to the sorted motion vectors, where the threshold (TH) may be expressed as a percentage in order to select a lowest percent of motion vectors. For example, if TH=0.5 with a total of 50 motion vectors assorted in an ascending manner, the first 25 motion vectors are selected from the sorted array of motion vectors. A mean motion vector is then calculated using the selected motion vectors. The optical flow results in a number of motion vectors including an x and y values. These motion vectors are averaged to find average x and y values. A third z value can be calculated using the depth information. The resultant mean motion vector (x, y, z) represents the estimated object movement via a whole hand motion vector, and includes three values. In embodiments, the whole hand motion vector may be calculated by via frame to frame object tracking.

At block 212, the histogram of the optical flow vector and the hand motion vector may be saved. In embodiments, the vector of HOOFs is saved with the whole hand motion vector into a cyclic history buffer. In embodiments, the cyclic history buffer is used to store the last n descriptor vectors. For example, if n=20, the vectors calculated for the last twenty frames are saved, with new frames overriding the old frames in a cyclic manner.

At block 214, a descriptor is created based on the histogram of the optical flow vector and the whole hand motion vector. In embodiments, the whole hand motion vector is added to the histogram based optical flow vector or a single frame feature vector for each frame. A descriptor may be a structure containing information that describes the data. In the present techniques, the descriptor describes the movement of the hand. From observing or analyzing the values in the descriptor, the movement in each frame can be represented. In embodiments, the descriptor may be created by concatenating the last K vectors, where the vectors are stored in the cyclic history buffer. In order to detect that a gesture has occurred, data is collected from at least the K previous frames. For each frame, the frame descriptor is saved to a buffer after concatenating the last K vectors. To detect if gesture is occurring or has occurred, the full descriptor is built. In embodiments, the size of a full descriptor is K*75, where K is a number of previous frames. In embodiments, the value of K is determined when building the classifier, and the value of K can depend on the time it takes to perform the gesture.

For example, a descriptor of the frame may be a vector of 75 values. The descriptor may contain 72 values from the nine histograms that are calculated at block 208, where each of the nine cells of the grid includes eight bins, such that 9*8=72. Three additional values may be added to the descriptor that represent the whole hand motion vector as found at block 210. As a result, in embodiments, the total length of a single frame descriptor is 72+3=75 values. To obtain the full descriptor, the single frame descriptor for K frames can be combined, such that the full descriptor is K*75 values.

At block 216, a classification algorithm may be ran on the descriptors. The classification algorithm may be used to determine the particular gesture that has occurred. At block 218 it is determined if the gesture is a recognized gesture. If the gesture is a recognized gesture, process flow continues to block 220. If the gesture is not a recognized gesture, process flow continues to block 222. At block 220, the corresponding gesture event is output in response to the descriptor being classified. At block 222, a new classification and/or gesture is created in response to the descriptor not matching known gestures.

Accordingly, the present techniques enable a descriptor creation that combines both the depth and IR data, and also creates a robust and invariant to scale, rotation and hand type (left/right) descriptor. In addition, the present techniques can use the cursor location to define descriptors. Using the depth data to get an accurate mask of the hand enables a small but reliable amount of feature points, which increases accuracy and performance. For the sake of simplicity, the present techniques are described as applying to depth and IR images. However, the same ideas can be applied on any subset of depth, IR, grayscale and RGB images with only minor modifications. For example, an RGB image can be used to create a whole hand motion vector instead of or in combination with IR data. In embodiments, a grayscale image may be calculated the RGB image and used to obtain the whole hand motion vector. In embodiments, both IR images and a grayscale image can be used to calculate the optical flow vectors and to calculate the descriptor on the resulted optical flow vectors.

Moreover, the present techniques enable the use of the depth image in order to extract accurate hand mask, which enables a search for feature points that lay on the hand itself and ignores the noisy points in the background. In addition, the search is for a small number of points, which helps keep a low processing time. In addition to the magnitudes of the motion vectors, the feature vector is also based on its angles. Using the 8 bins of 45 degrees to calculate the histogram based optical flow vector eases the process of rotating the descriptor, and by that makes it invariant to rotation and hand type (left vs. right). Moreover, normalizing the motion vectors magnitudes into meter units (using the depth data) makes the descriptor to be invariant to scale. Further, the hand motion vector given by the hand tracker contributes to the gesture's state machine (e.g. gesture that can happen only when the hand is in static mode). Possible states of the state machine include hand closing gesture, hand opening gesture, and non-gesture.

Figure 3:
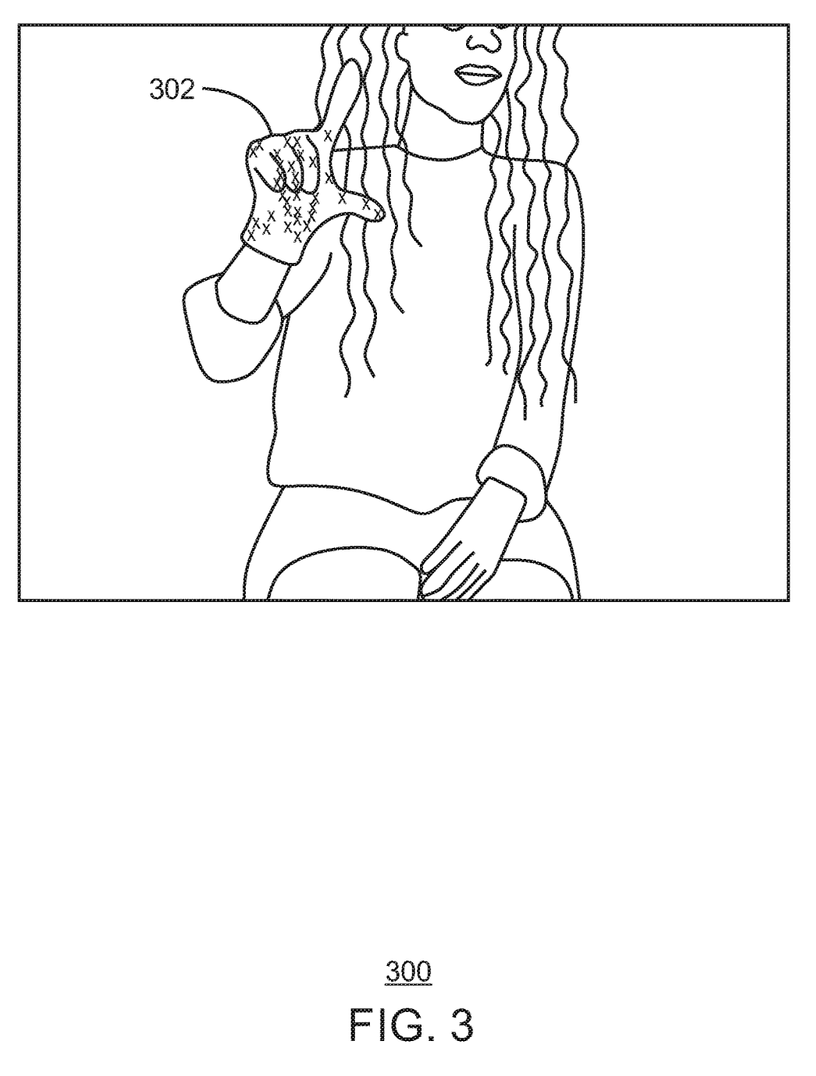
FIG. 3 is an infrared image.
Figure 4:
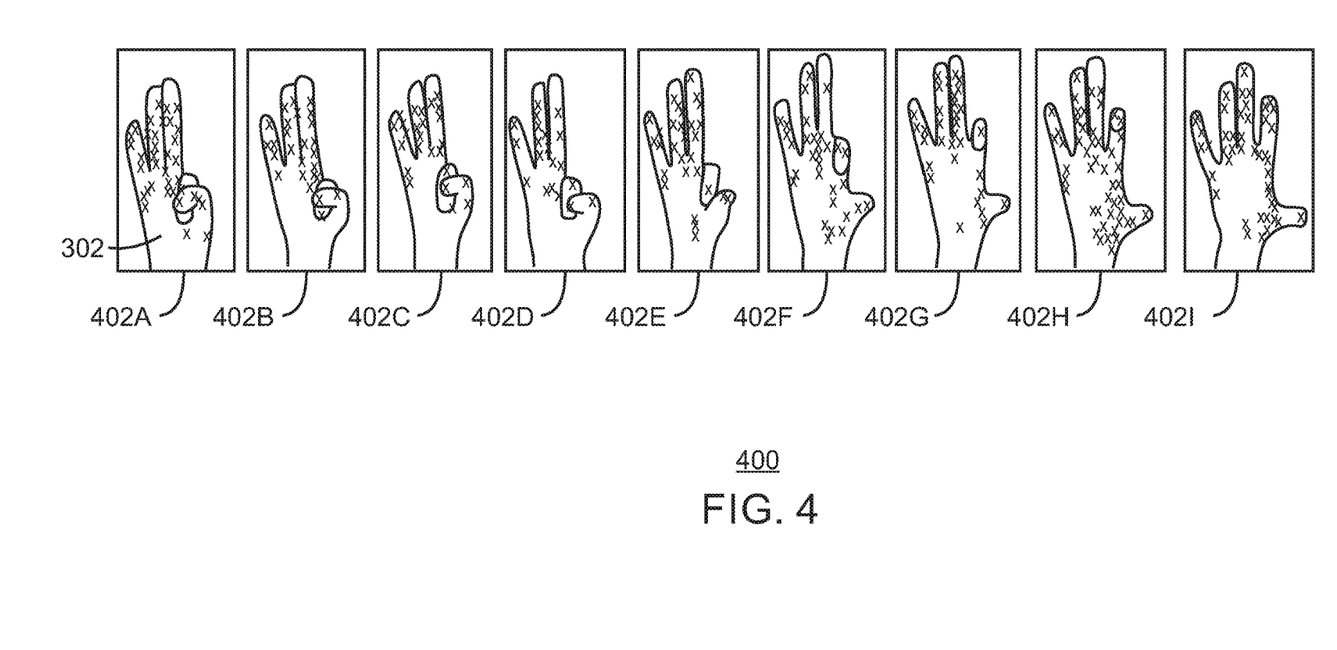
FIG. 4 illustrates a click open frame sequence from a hand.
Figure 5:
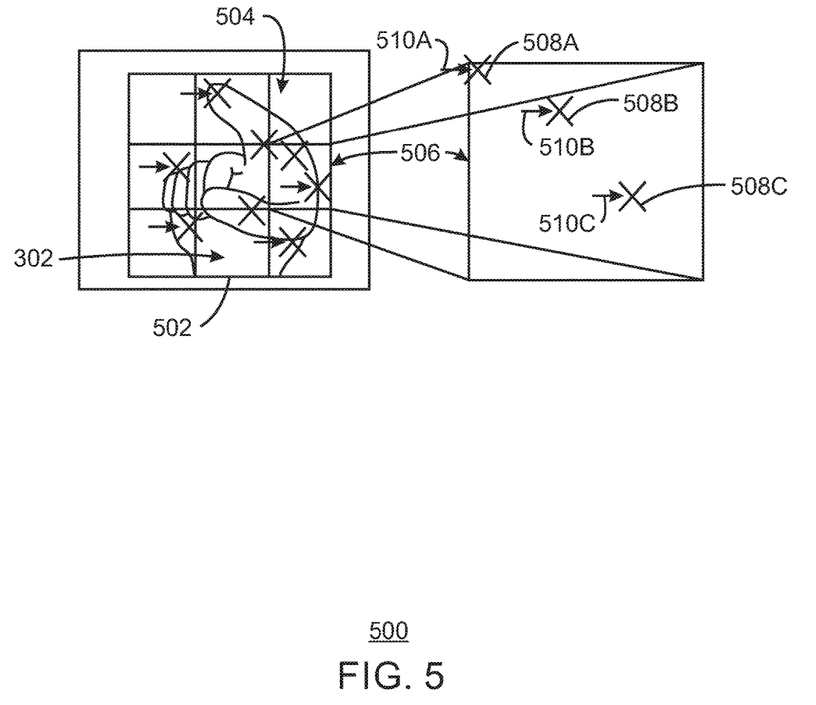
FIG. 5 is an illustration of a hand divided by a grid.

FIG. 3 is an infrared image 300. The infrared image 300 includes an object for tracking, which is a hand 302. The hand 302 has a plurality of points along the hand 302. In embodiments, the feature points are represented by x's along the hand 302. In FIGS. 3-5, feature points may be represented by x's.

FIG. 4 illustrates a click open frame sequence 400 from the hand 302. Each frame 402 includes various positions of the hand 302. Across the sequence of frames 402A-402I, the hand 302 may progress through a sequence of positions that result in a click open gesture across the plurality of frames 402. In embodiments, the feature points are a starting point of the good feature points to track. FIGS. 3-5 also include points that represent the end points of the motion vector (found by the optical flow algorithm). A line between the start and end points may represent the motion vector. Motion vectors may be found by applying an optical flow to feature points found in each pair of frames, resulting in a plurality of motion vectors for each consecutive pair of frames.

FIG. 5 is an illustration of a hand 302 divided by a grid 504. In particular, a bounding box 502 may be applied to the hand 302. The bounding box may be divided into a grid 504. In an example, for a cell 506 of the grid 504, an 8-bin histogram of optical flow is calculated for all motion vectors 510 within the cell 506. In FIG. 5, each feature point 508A, 508B, and 508C may be associated with a respective motion vector 510A, 510B, and 510C. Next, a nine HOOF for the grid 504 may be concatenated to one vector. Thus, for each cell one 8 bin HOOF is calculated. In the present case, the 3×3 grid results has nine cells, resulting in 9 HOOF. In embodiments, the HOOF may be an array of 8 values. All HOOF arrays are concatenated into one array (vector) of 72 values (which is 9 HOOFs, each HOOF contains 8 values per HOOF).

Figure 6:
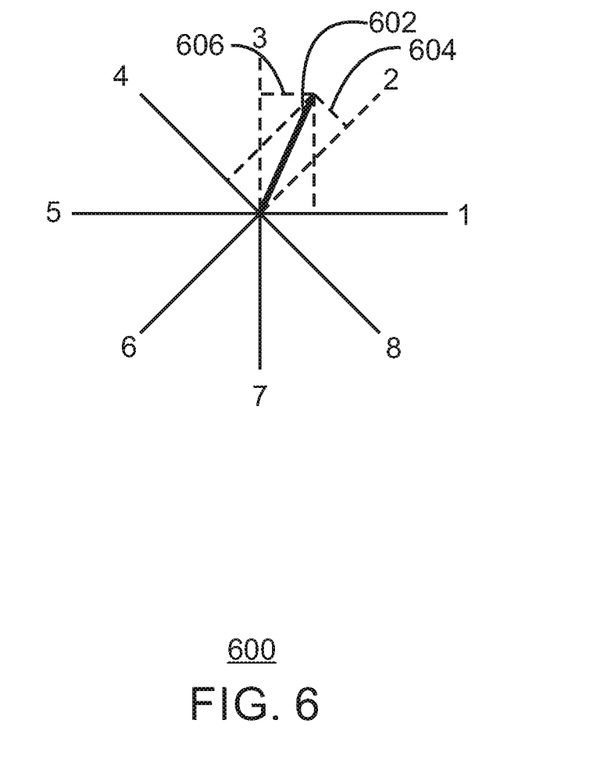
FIG. 6 is an illustration of a motion vector and its impact on each bin of the HOOF.

FIG. 6 is an illustration of a motion vector 602 and its impact on each bin of the HOOF. For ease of description, one motion vector is illustrated. However, a plurality of motion vectors may be found dependent upon the feature points found in each frame. The HOOF as described herein is an 8-bin histogram with 45 degrees for each bin. The equation below for $h_i(\theta)$ describes multiplying each flow value or motion vector by a unit vector to project the motion vectors into the HOOF. The $\varphi$ function below describes assigning a value of 0 to motion vectors that occur in a direction opposite of actual motion of the hand. Specifically, as illustrated in FIG. 6, for each ith spatial cell where $i \in \{1, \ldots, N \times N\}$ (N=3) and direction $\theta \in \{0, 45, 90, 135, 180, 225, 270, 315\}$ degrees, the optical flow histogram $h_i(\theta)$ is defined such that $$h_i(\theta) = \sum_{j \in B_i} \varphi(u_\theta * F_j)$$

where $F_j$ represents the flow value in each feature point j, $B_i$ is the set of feature points in the spatial bin i, and $u_\theta$ is the unit vector in $\theta$ direction and $\varphi$ function is defined as $$\varphi(x) = \begin{Bmatrix} 0 \text{ if } x \leq 0 \\ x \text{ if } x > 0 \end{Bmatrix}$$

By defining the HOOF as an 8-bin histogram with 45 degrees for each bin, the present techniques robust and invariant to scale, rotation and hand type (left/right). Thus, the descriptors previously recognized by a classification algorithm can be used to recognize a subsequent gesture based on its descriptor, regardless of the size, orientation, or hand type.

Figure 7:
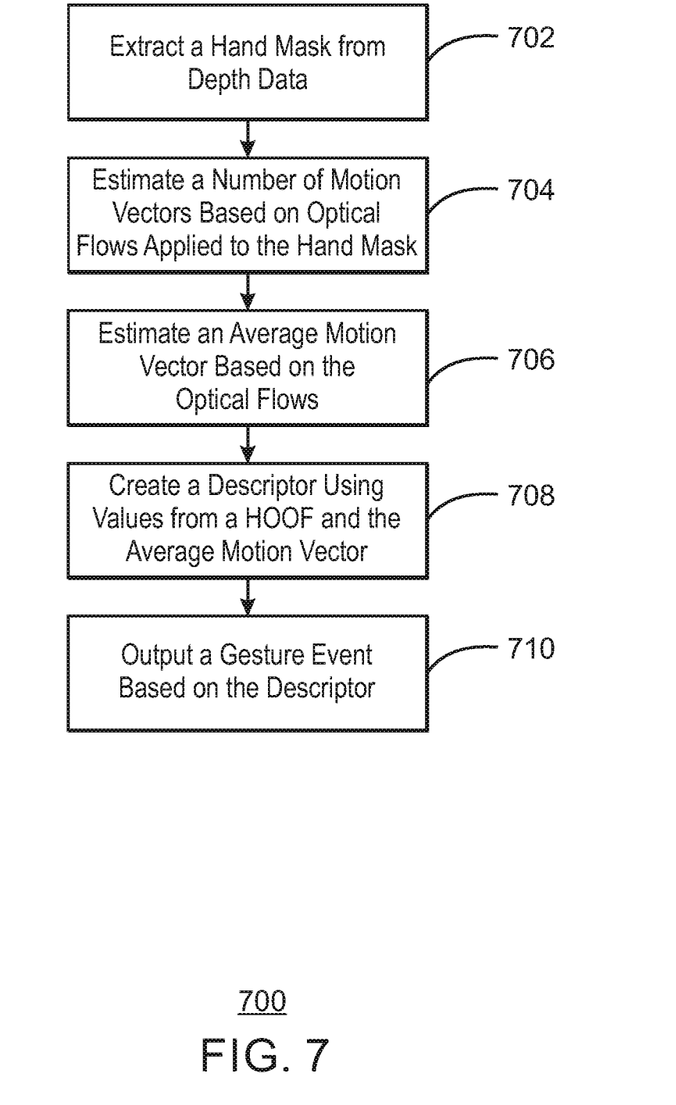
FIG. 7 is a process flow diagram of a method for hand gesture recognition for cursor control.

FIG. 7 is a process flow diagram of a method 700 for hand gesture recognition for cursor control. At block 702, a hand mask may be extracted from the depth data. To extract the hand mask as discussed above, the input may be a three dimensional (3D) image acquired by 3D camera which includes a depth image and IR image. The present techniques may also apply to a 2D image acquired by regular RGB with RGB to depth mapping. For every new frame the mask of the hand is extracted.

In an example, input images may be obtained, and the hand tracking may be performed with a sequence of images from a three dimensional (3D) camera. In embodiments, the sequence of images may be a sequence of a depth map, infrared, or color images. A depth image contains information relating to the distance of the surfaces of scene objects from a viewpoint. The infrared image is an image that displays the measured infrared (IR) light radiating from objects in its field of view. In some embodiments a 2D image is acquired by regular red, green, and blue (RGB) imaging with a translation from RGB to a depth map.

A foreground extractor algorithm is applied, combined with blob tracker to extract the hand mask from the frames. In embodiments, the hand mask is extracted from a frame that includes a depth image. The hand mask is a binary image, where all the pixels of the hand have a value equal to a first value, and all other pixels in the frame equal to a second value. For example, all the pixels of the hand may have a value equal to 255 while all other pixels in the frame have a value of 0. For every new frame the blob or mask of the hand is extracted. A foreground extractor algorithm is applied to each frame and combined with blob tracker. In this manner, frame to frame hand tracking can be performed and the mask or blob of the tracked hand is provided. As used herein, the foreground extractor is a module that separates the hand (foreground) from the background or everything else that is not the tracked object. The blob tracker is a module that tracks the hand from frame to frame, such that every foreground hand is attached to its corresponding hand from the previous frame.

At block 704, a number of motion vectors is estimated based on optical flows applied to the hand mask in consecutive frames. At block 706, an average motion vector is estimated based on the optical flows. The optical flows may be run on an IR image, RGB image, a greyscale image, or any other color model or color representation.

In embodiments, frame to frame object tracking may be performed to obtain an estimation of motion vectors. The object tracking may be based on feature points. Good feature points to track are located on the previous image. As illustrated in the click open sequence of FIG. 4, feature points may be illustrated x's on each frame. Good feature points can be found using Harris corner algorithm and they must be on the hand mask. For each point found on the previous image, the corresponding point is found in the current image using an optical flow algorithm. The vector between the previous point and the current point is defined to be the motion vector of this point.

Thus, an optical flow determination is performed on the feature points. Based on the motion of each individual feature point, the motion of the hand is described. In embodiments, the optical flow determines a pattern of apparent motion of objects, surfaces, and edges in the scene. The optical flow is used to determine the motion vectors of the feature points between consecutive frames. The movement of objects in a sequence of frames may be analyzed to obtain vectors that represent the estimated motion of the hand between frames. In embodiments, the frame is divided into macroblocks, and the motion vectors represent the change in position of a macroblock between frames. The optical flow may be performed using the Lucas-Kanade optical flow or Gunnar Farneback's algorithm. In embodiments, the optical flow can be implemented by any algorithm that enables frame to frame pixel tracking.

The hand mask may be tracked using a corner detection technique. The feature points are used as a starting point for the optical flow. The optical flow algorithm finds, for each feature point, the corresponding point in the next frame. These feature points should be good, or informative, to correctly track the object. In particular, the feature points must be on the hand mask, and not on the background. In embodiments, feature points describing the hand mask may be obtained via corner detection. A feature point is a point in an image which contains information regarding the structure of the image. Typically, image components such as corners and crosses of the hand indicate a good feature point, where a good feature point is one that can describe corners, crosses, or edges of an object. Additionally, good feature points may be locally unique, spatial localized, and scale invariant. Corners of the hand may be good feature points because they have large intensity differences in two different directions. Additionally, corners are likely to be locally unique and spatially localized.

Corner detection algorithms may provide a numerical score for each pixel of each frame. The score is a measure of the likelihood that the pixel is as a feature point that is detectable in the sequence of frames. An example corner detection algorithm is the Harris Corner algorithm. A threshold may be applied to the score found by the Harris Corner algorithm to distinguish good feature points from the set of feature points found by the Harris Corner algorithm. The good feature points that have been determined to define an object of interest can be used to provide accurate motion vectors in a sequence of frames. In this manner, the motion of each individual hand in the scene is computed.

Once the hand mask is extracted, motion vectors can be found and the hand gesture may be classified based on the motion vectors. In some cases, an estimation of the hand movement is performed. The estimation may be performed using the smallest half of the motion vectors that were extracted from the optical flow. The smallest half of the motion vectors may be averaged into a mean motion vector. To classify hand gesture based on motion vectors, a final descriptor may be built from N consecutive frames.

The number of motion vectors may be concatenated into a single frame feature vector. To build a single frame feature vector, the motion vectors are normalized into meter units, depending on the distance between the hand and the camera. The bounding box of the hand mask is calculated. In embodiments, the bounding box may be determined by finding an area of least volume that contains the hand mask. Next the bounding box may be divided into a grid. After the bounding box is divided into a grid, the motion descriptors are determined by first computing an 8-bin HOOF of all motion vectors in each cell of the grid. Additionally, the motion vector may be normalized into meter units. For each motion vector in a cell, the energy from the motion vector is added to 4 different bins, as illustrated by FIG. 6. The computed HOOF values are divided by the number of motion vectors that were used in building this histogram to get the average value of each bin. Thus, each cell has eight values, resulting in 72 values.

At block 708, the values from the HOOF and the whole hand motion values vector may be used form a descriptor. For example, for each frame, there are 8-bins of each histogram with nine cells, which results in 72 values from the HOOF. The average motion vector may contribute three values. Thus, for each frame a total of 75 values are concatenated for each single frame descriptor. The full descriptor is built and can include K frames. The number of frames can vary and may depend on the detected gesture. Shorter gestures (with respect to time) need less frames to determine fully represent the gesture. By concatenating the single frame descriptor for K frames, one descriptor is obtained.

At block 710, a gesture event may be output based on the descriptor. In embodiments, once the full descriptor is generated, a machine learning algorithm may be applied in order to classify the gesture.

Figure 8:
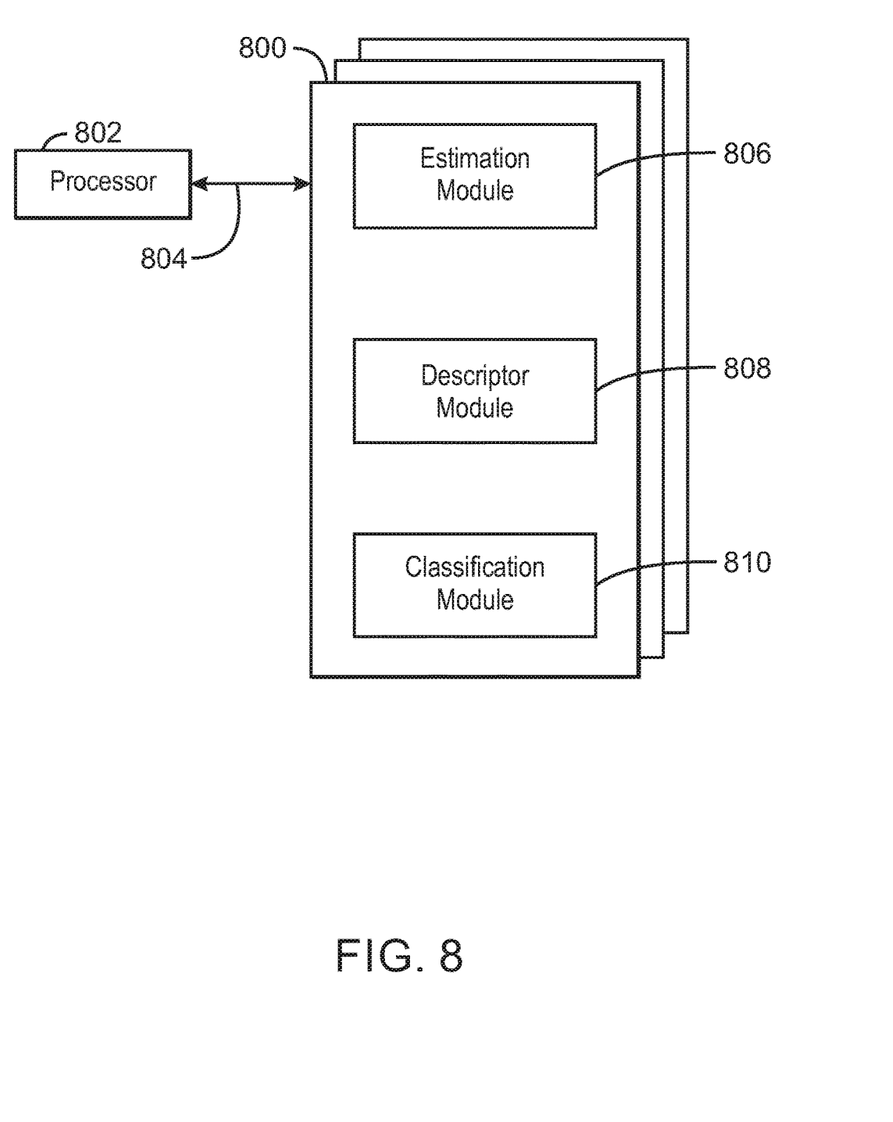
FIG. 8 is a block diagram showing a medium that contains logic for enabling a tracker for cursor navigation.

FIG. 8 is a block diagram showing a medium 800 that contains logic for enabling a tracker for cursor navigation. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 806-810 configured to perform the techniques described herein. For example, an estimation module 806 may be configured to estimate a number of motion vectors and an average motion vector. A descriptor module 808 may be configured to calculate a full descriptor that includes single frame descriptors for K-frames. A classification module 810 may be configured to classify the gesture and output a gesture event based on the descriptor. In some embodiments, the modules 806-810 may be modules of computer code configured to direct the operations of the processor 802.

The block diagram of FIG. 8 is not intended to indicate that the medium 800 is to include all of the components shown in FIG. 8. Further, the medium 800 may include any number of additional components not shown in FIG. 8, depending on the details of the specific implementation.

Example 1 is a system for hand gesture recognition. The system includes a display; a camera; a memory that is to store instructions and that is communicatively coupled to the camera and the display; and a processor communicatively coupled to the camera, the display, and the memory, wherein when the processor is to execute the instructions, the processor is to: estimate one or more motion vectors of an object using a pair of consecutive frames; estimate an average motion vector of the object; obtain a descriptor based on histogram values from a histogram of optical flow (HOOF) of the one or more motion vectors and the average motion vector; and classify the descriptor as a gesture.

Example 2 includes the system of example 1, including or excluding optional features. In this example, the system includes extracting a mask of the object using a depth image; and applying the optical flow to the mask of the object to obtain the one or more motion vectors.

Example 3 includes the system of any one of examples 1 to 2, including or excluding optional features. In this example, the histogram of the optical flow (HOOF) of the one or more motion vectors is built using a Lucas-Kanade optical flow algorithm.

Example 4 includes the system of any one of examples 1 to 3, including or excluding optional features. In this example, the histogram values and the average motion vectors are concatenated for a plurality of frames to obtain the descriptor.

Example 5 includes the system of any one of examples 1 to 4, including or excluding optional features. In this example, each descriptor includes histogram values and the average motion vector for K frames, wherein the value of K is dependent on the type of gesture.

Example 6 includes the system of any one of examples 1 to 5, including or excluding optional features. In this example, a machine learning algorithm is used to classify the descriptor as a gesture.

Example 7 includes the system of any one of examples 1 to 6, including or excluding optional features. In this example, the one or more motion vectors is calculated via an optical flow algorithm of a mask applied an infrared image, a red, green, blue (RGB) image, or a grayscale image.

Example 8 includes the system of any one of examples 1 to 7, including or excluding optional features. In this example, the average motion vector is estimated using good feature points are determined by corner tracking.

Example 9 includes the system of any one of examples 1 to 8, including or excluding optional features. In this example, the object is a hand.

Example 10 includes the system of any one of examples 1 to 9, including or excluding optional features. In this example, the gesture is used to control a cursor.

Example 11 is a method. The method includes extracting a hand mask using depth data; estimating a plurality of motion vectors based via an optical flow applied to the hand mask; estimating an average motion vector from the optical flow; generating a descriptor based on a histogram of optical flow applied to the hand mask and the average motion vector; and classifying the descriptor as a gesture.

Example 12 includes the method of example 11, including or excluding optional features. In this example, the histogram of optical flow is calculated for a plurality of cells of a frame, and a value is calculated for each bin of the histogram of optical flow by average values of the bin. Optionally, the average bin values and the average motion vector are concatenated for a plurality of frames to generate the descriptor.

Example 13 includes the method of any one of examples 11 to 12, including or excluding optional features. In this example, the method includes obtaining the plurality of motion vectors for a plurality of good feature points in a sequence of frames; selecting the motion vectors with a lowest length; and averaging the motion vectors with the lowest length to obtain the average motion vector.

Example 14 includes the method of any one of examples 11 to 13, including or excluding optional features. In this example, the descriptor is invariant to rotation and hand type.

Example 15 includes the method of any one of examples 11 to 14, including or excluding optional features. In this example, a movement corresponding to the gesture is applied to a cursor rendered on a display.

Example 16 includes the method of any one of examples 11 to 15, including or excluding optional features. In this example, each descriptor includes a concatenated plurality of histogram values and the average motion vector for K frames, wherein the value of K is dependent on a type of the gesture.

Example 17 includes the method of any one of examples 11 to 16, including or excluding optional features. In this example, a machine learning algorithm is used to classify the descriptor as a gesture.

Example 18 includes the method of any one of examples 11 to 17, including or excluding optional features. In this example, the hand mask is applied to an infrared image, a red, green, blue (RGB) image, or a grayscale image to estimate the plurality of motion vectors.

Example 19 includes the method of any one of examples 11 to 18, including or excluding optional features. In this example, the plurality of motion vectors and the average motion vector are estimated via frame to frame pixel tracking.

Example 20 is an apparatus for hand gesture recognition. The apparatus includes an image capture mechanism to obtain a sequence of frames; an estimator to estimate a plurality of motion vectors and an average motion vector for each frame of the sequence of frames; a generator to generate a descriptor based on a histogram of the plurality of motion vectors and the average motion vector for the sequence of frames; and a classifier to classify the descriptor as a gesture.

Example 21 includes the apparatus of example 20, including or excluding optional features. In this example, the histogram is a histogram of optical flow, and the one or more motion vectors is projected onto the histogram of optical flow.

Example 22 includes the apparatus of any one of examples 20 to 21, including or excluding optional features. In this example, a frame is divided into a plurality of cells, and a histogram of optical flow is calculated for each cell, and each bin the histogram of optical flow is averaged to obtain the single frame feature vector that comprises histogram values.

Example 23 includes the apparatus of any one of examples 20 to 22, including or excluding optional features. In this example, histogram values and the average motion vector for each frame of the sequence of frames are concatenated to generate the descriptor.

Example 24 includes the apparatus of any one of examples 20 to 23, including or excluding optional features. In this example, each descriptor includes a set of histogram values and the average motion vector for K frames, wherein the value of K is dependent on the type of gesture.

Example 25 includes the apparatus of any one of examples 20 to 24, including or excluding optional features. In this example, the classifier includes a machine learning algorithm.

Example 26 includes the apparatus of any one of examples 20 to 25, including or excluding optional features. In this example, the average motion vector is based on good feature points of a mask applied to an infrared image, a red, green, blue (RGB) image, or a grayscale image.

Example 27 includes the apparatus of any one of examples 20 to 26, including or excluding optional features. In this example, the plurality of motion vectors is based on an optical flow applied to a hand mask.

Example 28 includes the apparatus of any one of examples 20 to 27, including or excluding optional features. In this example, a hand mask is extracted from each frame of the sequence of frames to estimate the plurality of motion vectors.

Example 29 includes the apparatus of any one of examples 20 to 28, including or excluding optional features. In this example, the gesture is used to control a cursor.

Example 30 is a tangible, non-transitory, computer-readable medium. The computer-readable medium includes instructions that direct the processor to extract a hand mask using depth data; estimate a plurality of motion vectors based via an optical flow applied to the hand mask; estimate an average motion vector from the optical flow; generate a descriptor based on a histogram of optical flow applied to the hand mask and the average motion vector; and classify the descriptor as a gesture.

Example 31 includes the computer-readable medium of example 30, including or excluding optional features. In this example, the histogram of optical flow is calculated for a plurality of cells of a frame, and a value is calculated for each bin of the histogram of optical flow by average values of the bin. Optionally, the average bin values and the average motion vector are concatenated for a plurality of frames to generate the descriptor.

Example 32 includes the computer-readable medium of any one of examples 30 to 31, including or excluding optional features. In this example, the computer-readable medium includes obtaining the plurality of motion vectors for a plurality of good feature points in a sequence of frames; selecting the motion vectors with a lowest length; and averaging the motion vectors with the lowest length to obtain the average motion vector.

Example 33 includes the computer-readable medium of any one of examples 30 to 32, including or excluding optional features. In this example, the descriptor is invariant to rotation and hand type.

Example 34 includes the computer-readable medium of any one of examples 30 to 33, including or excluding optional features. In this example, a movement corresponding to the gesture is applied to a cursor rendered on a display.

Example 35 includes the computer-readable medium of any one of examples 30 to 34, including or excluding optional features. In this example, each descriptor includes a concatenated plurality of histogram values and the average motion vector for K frames, wherein the value of K is dependent on a type of the gesture.

Example 36 includes the computer-readable medium of any one of examples 30 to 35, including or excluding optional features. In this example, a machine learning algorithm is used to classify the descriptor as a gesture.

Example 37 includes the computer-readable medium of any one of examples 30 to 36, including or excluding optional features. In this example, the hand mask is applied to an infrared image, a red, green, blue (RGB) image, or a grayscale image to estimate the plurality of motion vectors.

Example 38 includes the computer-readable medium of any one of examples 30 to 37, including or excluding optional features. In this example, the plurality of motion vectors and the average motion vector are estimated via frame to frame pixel tracking.

Example 39 is an apparatus for hand gesture recognition. The apparatus includes instructions that direct the processor to an image capture mechanism to obtain a sequence of frames; a means to estimate a plurality of motion vectors and an average motion vector for each frame of the sequence of frames; a means to generate a descriptor based on a histogram of the plurality of motion vectors and the average motion vector for the sequence of frames; and a classifier to classify the descriptor as a gesture.

Example 40 includes the apparatus of example 39, including or excluding optional features. In this example, the histogram is a histogram of optical flow, and the one or more motion vectors is projected onto the histogram of optical flow. Optionally, a frame is divided into a plurality of cells, and a histogram of optical flow is calculated for each cell, and each bin the histogram of optical flow is averaged to obtain the single frame feature vector that comprises histogram values.

Example 41 includes the apparatus of any one of examples 39 to 40, including or excluding optional features. In this example, histogram values and the average motion vector for each frame of the sequence of frames are concatenated to generate the descriptor.

Example 42 includes the apparatus of any one of examples 39 to 41, including or excluding optional features. In this example, each descriptor includes a set of histogram values and the average motion vector for K frames, wherein the value of K is dependent on the type of gesture.

Example 43 includes the apparatus of any one of examples 39 to 42, including or excluding optional features. In this example, the classifier includes a machine learning algorithm.

Example 44 includes the apparatus of any one of examples 39 to 43, including or excluding optional features. In this example, the average motion vector is based on good feature points of a mask applied to an infrared image, a red, green, blue (RGB) image, or a grayscale image.

Example 45 includes the apparatus of any one of examples 39 to 44, including or excluding optional features. In this example, the plurality of motion vectors is based on an optical flow applied to a hand mask.

Example 46 includes the apparatus of any one of examples 39 to 45, including or excluding optional features. In this example, a hand mask is extracted from each frame of the sequence of frames to estimate the plurality of motion vectors.

Example 47 includes the apparatus of any one of examples 39 to 46, including or excluding optional features. In this example, the gesture is used to control a cursor.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for hand gesture recognition, comprising:
a display;
a camera;
a memory that is to store instructions and that is communicatively coupled to the camera and the display; and
a processor communicatively coupled to the camera, the display, and the memory, wherein when the processor is to execute the instructions, the processor is to:
estimate one or more motion vectors of an object using a pair of consecutive frames;
estimate an average motion vector of the object;
obtain a descriptor based on histogram values from a histogram of optical flow (HOOF) of the one or more motion vectors and the average motion vector; and
classify the descriptor as a gesture.

2. The system of claim 1, comprising:
extracting a mask of the object using a depth image; and
applying the optical flow to the mask of the object to obtain the one or more motion vectors.

3. The system of claim 1, wherein the histogram of the optical flow (HOOF) of the one or more motion vectors is built using a Lucas-Kanade optical flow algorithm.

4. The system of claim 1, wherein the histogram values and the average motion vectors are concatenated for a plurality of frames to obtain the descriptor.

5. The system of claim 1, wherein each descriptor includes histogram values and the average motion vector for K frames, wherein the value of K is dependent on the type of gesture.

6. The system of claim 1, wherein a machine learning algorithm is used to classify the descriptor as a gesture.

7. The system of claim 1, wherein the one or more motion vectors is calculated via an optical flow algorithm of a mask applied an infrared image, a red, green, blue (RGB) image, or a grayscale image.

8. The system of claim 1, wherein the average motion vector is estimated using good feature points are determined by corner tracking.

9. The system of claim 1, wherein the object is a hand.

10. The system of claim 1, wherein the gesture is used to control a cursor.

11. A method, comprising:
extracting a hand mask using depth data;
estimating a plurality of motion vectors based via an optical flow applied to the hand mask;
estimating an average motion vector from the optical flow;
generating a descriptor based on a histogram of optical flow applied to the hand mask and the average motion vector; and
classifying the descriptor as a gesture.

12. The method of claim 11, wherein the histogram of optical flow is calculated for a plurality of cells of a frame, and a value is calculated for each bin of the histogram of optical flow by average values of the bin.

13. The method of claim 12, wherein the average bin values and the average motion vector are concatenated for a plurality of frames to generate the descriptor.

14. The method of claim 11, comprising:
obtaining the plurality of motion vectors for a plurality of good feature points in a sequence of frames;
selecting the motion vectors with a lowest length; and
averaging the motion vectors with the lowest length to obtain the average motion vector.

15. The method of claim 11, wherein the descriptor is invariant to rotation and hand type.

16. The method of claim 11, wherein a movement corresponding to the gesture is applied to a cursor rendered on a display.

17. An apparatus for hand gesture recognition, comprising:
an image capture mechanism to obtain a sequence of frames;
an estimator to estimate a plurality of motion vectors and an average motion vector for each frame of the sequence of frames;
a generator to generate a descriptor based on a histogram of the plurality of motion vectors and the average motion vector for the sequence of frames; and
a classifier to classify the descriptor as a gesture.

18. The apparatus of claim 17, wherein the histogram is a histogram of optical flow, and the one or more motion vectors is projected onto the histogram of optical flow.

19. The apparatus of claim 17, wherein a frame is divided into a plurality of cells, and a histogram of optical flow is calculated for each cell, and each bin the histogram of optical flow is averaged to obtain the single frame feature vector that comprises histogram values.

20. The apparatus of claim 17, wherein histogram values and the average motion vector for each frame of the sequence of frames are concatenated to generate the descriptor.

21. The apparatus of claim 17, wherein each descriptor includes a set of histogram values and the average motion vector for K frames, wherein the value of K is dependent on the type of gesture.

22. A tangible, non-transitory, computer-readable medium comprising instructions that, when executed by a processor, direct the processor to:
extract a hand mask using depth data;
estimate a plurality of motion vectors based via an optical flow applied to the hand mask;

estimate an average motion vector from the optical flow;
generate a descriptor based on a histogram of optical flow applied to the hand mask and the average motion vector; and
classify the descriptor as a gesture.

23. The computer readable medium of claim 22, wherein each descriptor includes a concatenated plurality of histogram values and the average motion vector for K frames, wherein the value of K is dependent on a type of the gesture.

24. The computer readable medium of claim 22, wherein a machine learning algorithm is used to classify the descriptor as a gesture.

25. The computer readable medium of claim 22, wherein the hand mask is applied to an infrared image, a red, green, blue (RGB) image, or a grayscale image to estimate the plurality of motion vectors.

* * * * *